(12) United States Patent
Artsiely

(10) Patent No.: US 6,669,144 B2
(45) Date of Patent: Dec. 30, 2003

(54) ACCESS APPARATUS

(75) Inventor: Eyal Artsiely, Bikat Yericho (IL)

(73) Assignee: Rav Bariach Security Products Ltd., Yayne (IL)

( * ) Notice: Subject to any disclaimer, the term of this patent is extended or adjusted under 35 U.S.C. 154(b) by 0 days.

(21) Appl. No.: 10/304,064

(22) Filed: Nov. 26, 2002

(65) Prior Publication Data

US 2003/0122036 A1 Jul. 3, 2003

Related U.S. Application Data

(63) Continuation of application No. 09/987,311, filed on Nov. 14, 2001, now Pat. No. 6,484,449.

(30) Foreign Application Priority Data

Sep. 16, 2001 (IL) .................................................. 145462

(51) Int. Cl.[7] .................................................. B64C 1/14
(52) U.S. Cl. ........................ 244/129.5; 49/505; 292/62; 292/57; 244/118.5
(58) Field of Search .......................... 244/118.5, 129.4, 244/129.5; 49/169, 171, 135, 31, 506; 454/70, 71, 72, 73, 76, 195, 224, 255, 340; 292/62, 57, 67, 1

(56) References Cited

U.S. PATENT DOCUMENTS

| 2,748,855 | A | * | 6/1956 | Siems et al. ............. 244/129.5 |
| 5,085,017 | A | * | 2/1992 | Hararat-Tehrani ........ 244/118.5 |
| 5,118,053 | A | * | 6/1992 | Singh et al. ............. 244/118.5 |
| 6,336,293 | B1 | * | 1/2002 | Kamimura ................... 49/171 |
| 2003/0047648 | A1 | * | 3/2003 | Batt et al. ................ 244/118.5 |
| 2003/0052227 | A1 | * | 3/2003 | Pittman ................... 244/118.5 |
| 2003/0066930 | A1 | * | 4/2003 | Pratt et al. .............. 244/118.5 |

* cited by examiner

Primary Examiner—Galen L. Barefoot
(74) Attorney, Agent, or Firm—David Klein; Dekel Patent Ltd.

(57) ABSTRACT

Access apparatus including an access device including at least one of a door and a window, the access device including at least one openable element; and opening apparatus adapted to open the at least one openable element in a presence of a pressure difference of a predefined magnitude between opposite sides of the access device.

11 Claims, 12 Drawing Sheets

ACCESS APPARATUS

CROSS-REFERENCE TO RELATED APPLICATIONS

This application is a continuation of U.S. patent application Ser. No. 09/987,311, filed Nov. 14, 2001, now U.S. Pat. No. 6,484,449, and assigned to the common assignee of the present invention.

FIELD OF THE INVENTION

The present invention relates generally to access apparatus, e.g., door openers, and more specifically, to access apparatus that opens an access device, e.g., a door or window or the like, upon a pressure difference between opposite sides of the access device.

BACKGROUND OF THE INVENTION

Passenger planes or other aircraft may be equipped with cockpit doors. The cockpit door may be a simple door that provides privacy to the pilot, copilot or flight crew. (It is noted that the term "cockpit" refers to the portion of the aircraft where the pilot, copilot or flight crew sit, this also being referred to as the "flight deck".)

In many aircraft, it may be required that the ambient air pressure in the cockpit be generally the same as the ambient air pressure in the passenger cabin of the aircraft. A dangerous situation may arise if there is a sufficiently great pressure difference between opposite sides of the cockpit door. The pressure difference may cause the cockpit to break away from the rest of the fuselage. Accordingly, the cockpit door is generally a low security door that easily opens in the presence of a sufficiently great pressure difference between opposite sides of the door. Once the door opens the pressure equalizes between the flight deck and the passenger cabin, thereby reducing or eliminating the dangerous pressure difference.

However, because of the need to equalize the pressure, cockpit doors are generally low security doors, as mentioned above, and may be prone to attempted entry by would-be hijackers.

SUMMARY OF THE INVENTION

The present invention seeks to provide access apparatus that opens an access device, e.g., a door or window or the like, upon a pressure difference between opposite sides of the access device. For example, the access apparatus may be a door opener that retracts and opens a door bolt in the presence of a sufficiently great pressure difference between opposite sides of the door. Another embodiment of the present invention opens a portion of a door, such as vanes or slats, in the presence of a sufficiently great pressure difference between opposite sides of the door. Another embodiment of the present invention permits installation of a high security door in the cockpit of an aircraft, such as a bullet-proof door that withstands attempted entry by would-be hijackers.

There is thus provided in accordance with a preferred embodiment of the present invention access apparatus including an access device including at least one of a door and a window, the access device including at least one openable element, and opening apparatus adapted to open the at least one openable element in a presence of a pressure difference of a predefined magnitude between opposite sides of the access device.

In accordance with a preferred embodiment of the present invention the opening apparatus includes an opening orientation adapted to bring the access device into an open position with respect to an access passageway in a presence of a pressure difference of a predefined magnitude between opposite sides of the access device.

Further in accordance with a preferred embodiment of the present invention the at least one openable element includes a locking device.

Still further in accordance with a preferred embodiment of the present invention the at least one openable element includes a vane pivotally mounted in the access device, the vane when in an open position permitting fluid flow therethrough.

In accordance with a preferred embodiment of the present invention the opening apparatus includes a trigger device adapted to urge the opening apparatus to the opening orientation.

Further in accordance with a preferred embodiment of the present invention the trigger device includes a flap arranged to move in the presence of the pressure difference, wherein a predefined movement of the flap actuates the trigger device.

Still further in accordance with a preferred embodiment of the present invention a guard is provided and adapted to generally prevent access to the opening apparatus.

In accordance with a preferred embodiment of the present invention the access device includes at least one of an anti-terrorist door and an anti-terrorist window.

There is also provided in accordance with a preferred embodiment of the present invention an access system including an access passageway formed in at least one of a wall, ceiling and floor, an access device including at least one of a door and a window mounted for providing access through the access passageway, the access device including at least one openable element, and opening apparatus adapted to open the at least one openable element in a presence of a pressure difference of a predefined magnitude between opposite sides of the access device.

In accordance with a preferred embodiment of the present invention the opening apparatus includes an opening orientation adapted to bring the access device into an open position with respect to the access passageway in a presence of a pressure difference of a predefined magnitude between opposite sides of the access device.

Further in accordance with a preferred embodiment of the present invention the at least one openable element includes a locking device.

Still further in accordance with a preferred embodiment of the present invention the at least one openable element includes a vane pivotally mounted in the access device, the vane when in an open position permitting fluid flow therethrough.

There is also provided in accordance with a preferred embodiment of the present invention a method for depressurizing an enclosure in an aircraft, the method including forming an access passageway in at least one of a wall, ceiling and floor of the enclosure, installing an access device adapted for providing access through the access passageway, the access device including at least one openable element, and providing opening apparatus adapted to open the at least one openable element in a presence of a pressure difference of a predefined magnitude between opposite sides of the access device.

There is also provided in accordance with a preferred embodiment of the present invention a method for increasing security of a cockpit of an aircraft against a terrorist attack, the method including assembling a door in a door frame of a cockpit of an aircraft, the door including an anti-terrorist door, providing a bolt that is throwable and retractable from the door to the door frame, and providing bolt retractor apparatus adapted to retract the bolt in a presence of a pressure difference of a predefined magnitude between opposite sides of the door.

BRIEF DESCRIPTION OF THE DRAWINGS

The present invention will be understood and appreciated more fully from the following detailed description taken in conjunction with the drawings in which.

DETAILED DESCRIPTION OF THE PREFERRED EMBODIMENT

The present invention is directed to an access device, e.g., a door or window, and opening apparatus that opens one or more openable elements of the access device in a presence of a pressure difference of a predefined magnitude between opposite sides of the access device. The present invention will first be described with reference to an embodiment wherein the access apparatus comprises a door opener, as seen in FIGS. 1–8. Further embodiments will be described with reference to FIGS. 9–12.

Reference is now made to FIGS. 1–4, which illustrate a door opener, constructed and operative in accordance with a preferred embodiment of the present invention.

The door opener may comprise bolt retractor apparatus 10 (also referred to as a trigger device) adapted to retract a bolt 12 of a door 14 in a presence of a pressure difference of a predefined magnitude between opposite sides of the door.

Door 14 may be installed in a door frame 16. Door 14 may comprise a cockpit door for an aircraft, but the invention is not limited to aircraft, and the door 14 is suitable for any application requiring operation due to pressure differences between two sides of a door. Door 14 may comprise, for example, an anti-terrorist door that is reinforced with anti-ballistic structure.

It is noted that the term door is used to mean not only a door but also any kind of openable and closable structure used to open or close a room or enclave, such as but not limited to a window.

Figure 1:
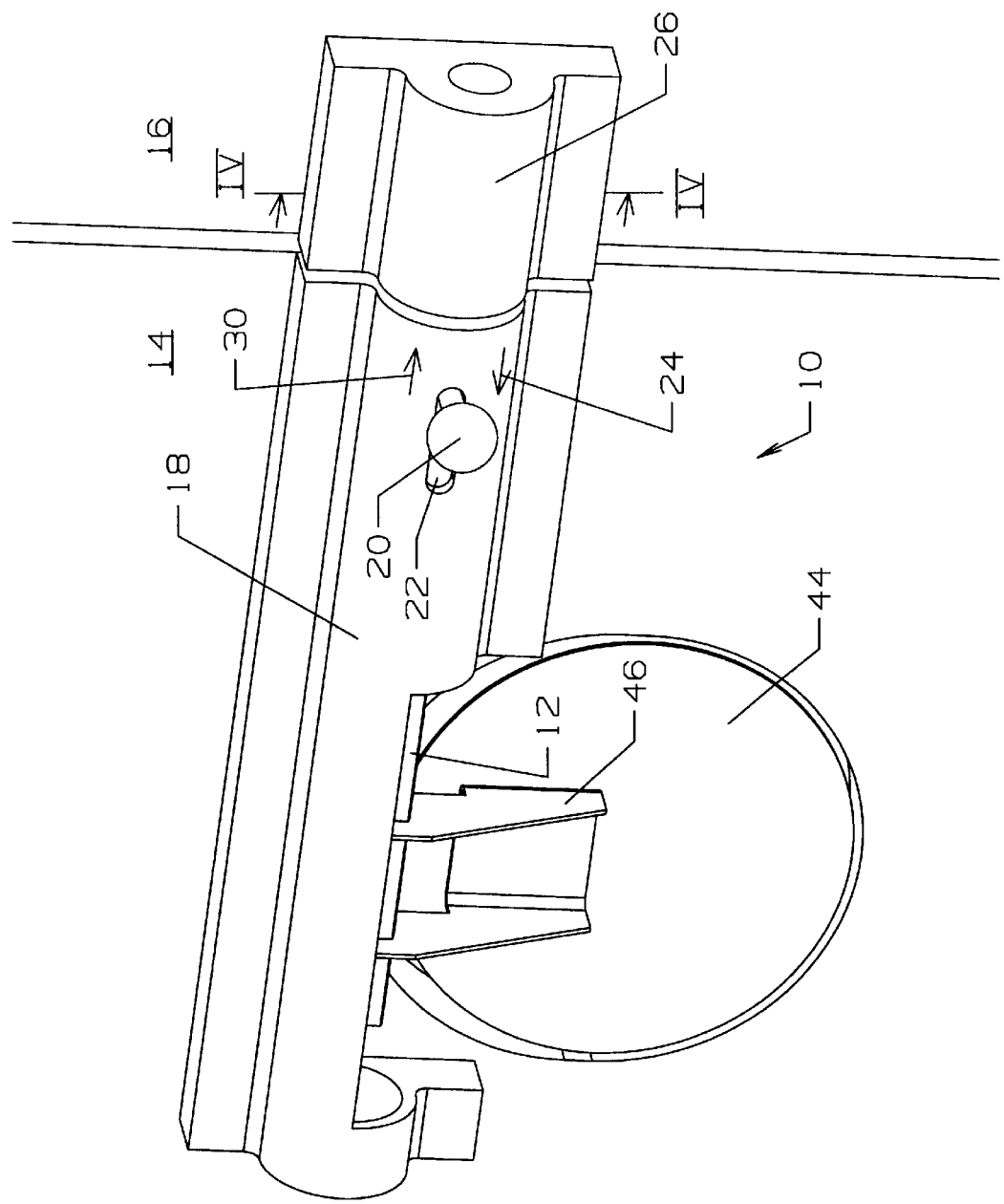
FIG. 1 is a simplified pictorial illustration of a door opener, constructed and operative in accordance with a preferred embodiment of the present invention.
Figure 2:
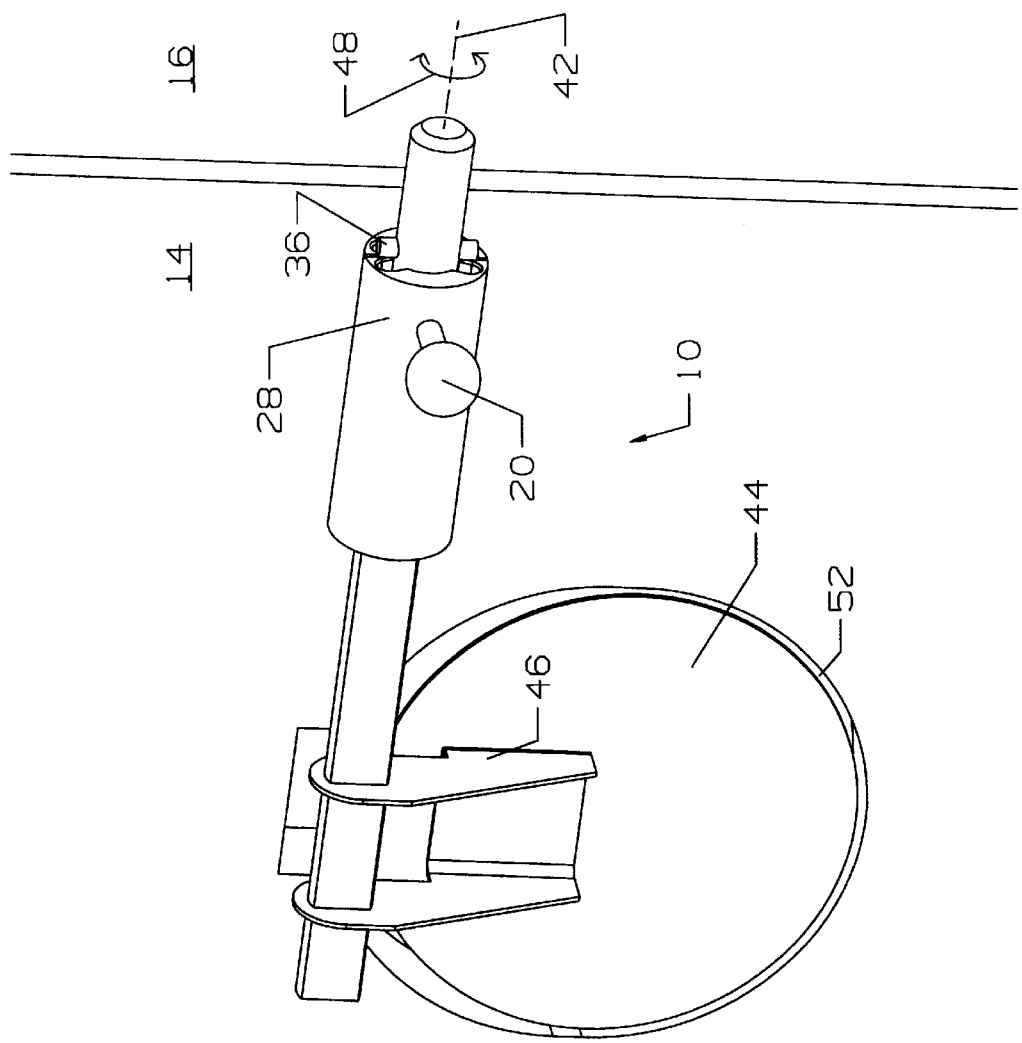
FIG. 2 is a simplified pictorial illustration of the door opener of FIG. 1 with a cover removed to expose operating elements of the door opener.

Bolt 12 (also referred to as a latch or any other kind of opening, closing and locking device, all the terms being used interchangeably throughout the specification and claims) may slide in an outer cover 18 and may be slid by means of a knob 20 which may be constrained to move in a groove 22 formed in outer cover 18 (FIG. 1). As seen in FIG. 2, knob 20 may be attached to a housing 28 that slides in outer cover 18 (as seen in FIG. 4). Bolt 12 may be thrown by means of knob 20 in the direction of an arrow 24 into a bolt receiving member 26 mounted on door frame 16 (FIG. 1). Conversely, bolt 12 may be retracted by means of knob 20 in the direction of an arrow 30 out of bolt receiving member 26 (FIG. 1). FIGS. 1–4 illustrate the door opener from the side of the room or enclave that is to be protected from unauthorized entry. Thus, only the authorized personnel in the room or enclave may have access to the knob 20 to throw or retract bolt 12.

Figure 3:
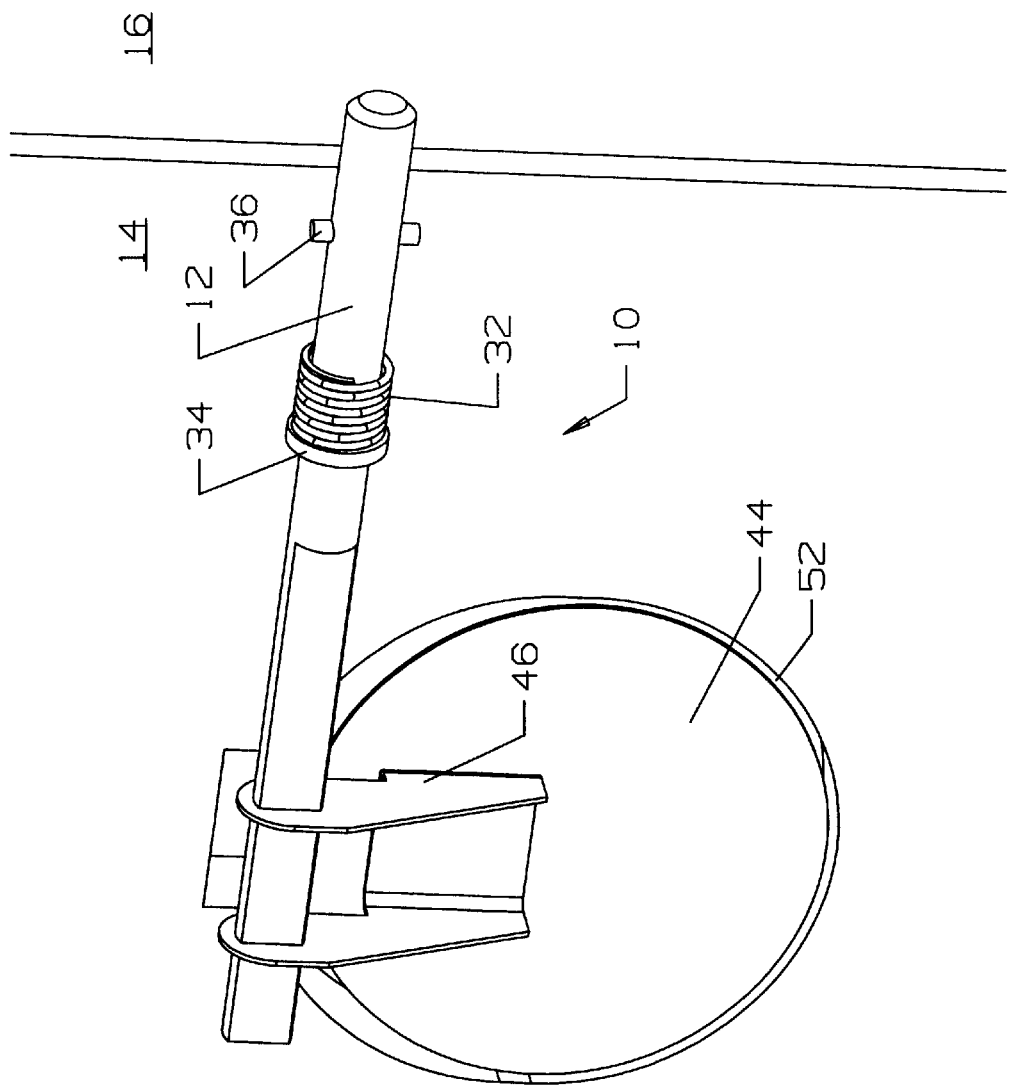
FIG. 3 is a simplified pictorial illustration of the door opener of FIG. 1 with a housing removed to expose a retaining device and a biasing device of the door opener.
Figure 4:
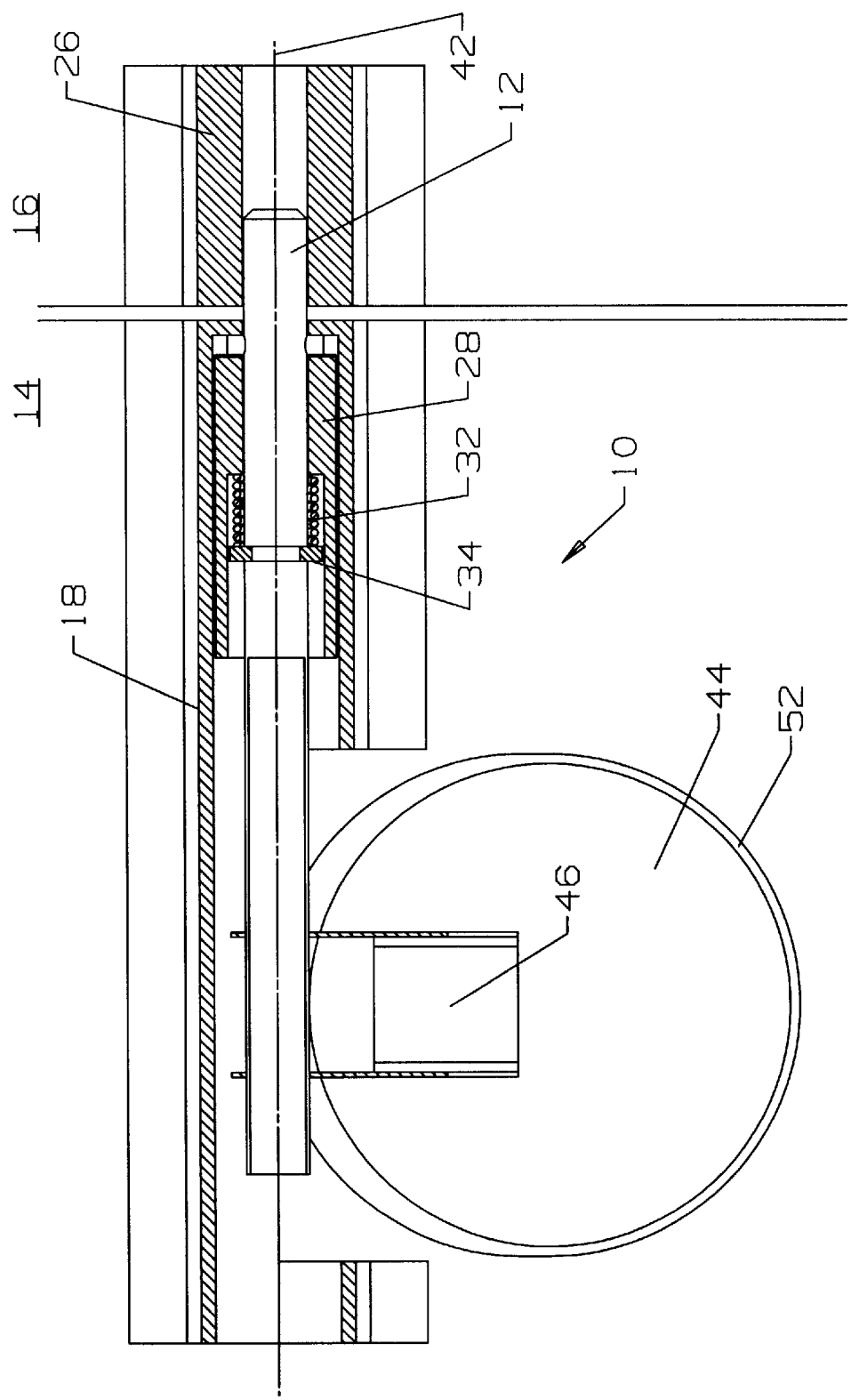
FIG. 4 is a simplified sectional illustration of the door opener of FIG. 1, FIG. 4 being taken along lines IV—IV in FIG. 1.

Referring particularly to FIGS. 3 and 4, bolt retractor apparatus 10 may comprise a biasing device 32, such as but not limited to, a coil spring mounted on bolt 12, for example, adapted to urge bolt 12 in the direction of arrow 30 to a retracted position. Biasing device 32 may abut against a ring 34 mounted on bolt 12. A retaining device 36 may be provided that comprises a first orientation, shown in FIGS. 1–5, wherein retaining device 36 may retain bolt 12 in a non-retracted position. Retaining device 36 may comprise without limitation a pin secured in a hole through bolt 12.

Figure 5:
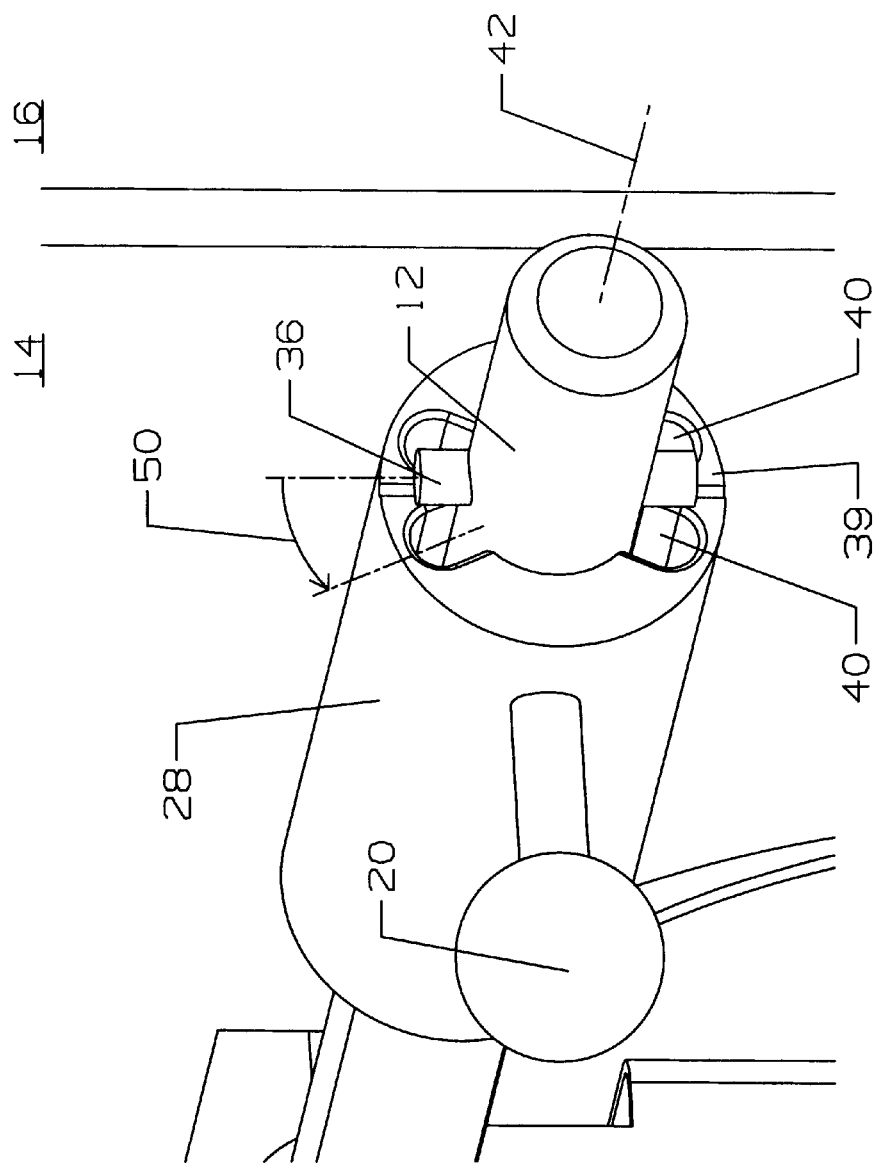
FIG. 5 is a more detailed pictorial illustration of the retaining device and housing of the door opener of FIG. 1, constructed and operative in accordance with a preferred embodiment of the present invention.

As seen more clearly in FIG. 5, housing 28 may comprise without limitation an abutment 38 and one or more recesses 40. In the first orientation shown in FIGS. 1–5, retaining device 36 abuts against abutment 38. Although bolt 12 is free to slide and rotate about its longitudinal axis 42 in housing 38, nevertheless retaining device 36 remains abutted against abutment 38 and may not normally rotate out of the first orientation if there is no pressure difference between the two sides of door 14. Knob 20 is constrained in groove 22, and may not be used to rotate bolt 12 about axis 42.

Figure 6:
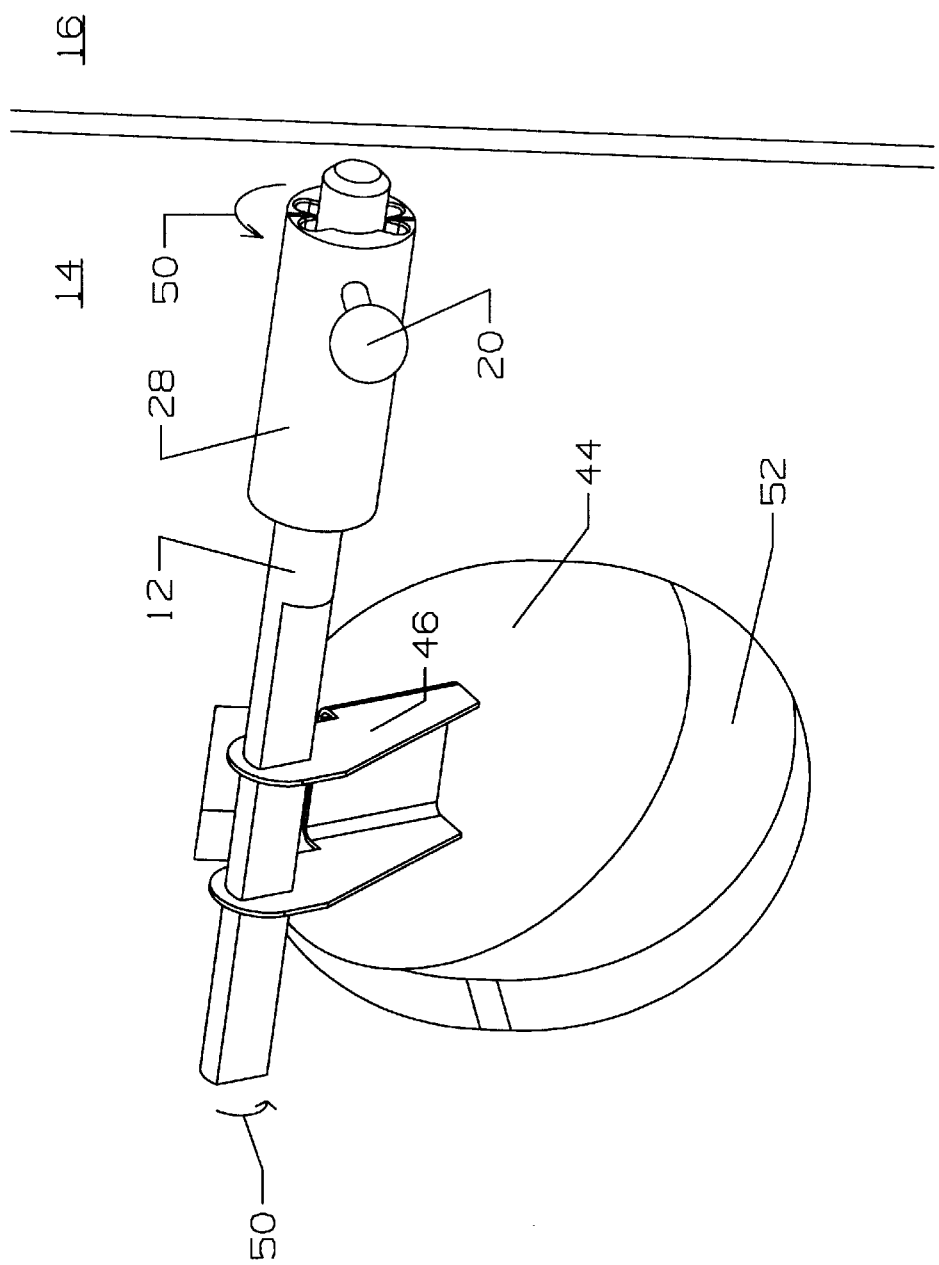
FIG. 6 is a simplified pictorial illustration of the door opener of FIG. 1 with pressure apparatus actuating bolt retractor apparatus so as to retract a door bolt in accordance with a preferred embodiment of the present invention.

Referring again to FIGS. 1–4, bolt retractor apparatus 10 may comprise a flap 44 secured to bolt 12, such as by means of a flange 46, for example. A pressure difference (in the ambient atmosphere) of a predefined magnitude between opposite sides of the door 14 pushes flap 44, thereby causing bolt 12 to rotate about axis 42 (either clockwise or counterclockwise), as indicated by double arrow 48 in FIG. 2. A predefined movement, e.g., rotation, of flap 44 actuates bolt retractor apparatus 10. Referring to FIGS. 5 and 6, this may be accomplished by flap 44 rotating bolt 12 so that retaining device 36 is aligned with and receivable in one of the recesses 40 (indicated, for example, by an arrow 50). Once retaining device 36 is aligned with one of the recesses 40, biasing device 32 urges retaining device 36 into a second orientation by urging and pulling retaining device 36 into the recess 40, thereby retracting bolt 12 (direction of arrow 30 in FIG. 1). Door 14 may be formed with an aperture 52 that permits at least a portion of flap 44 to move into aperture 52 when moved by the pressure difference.

Figure 7:
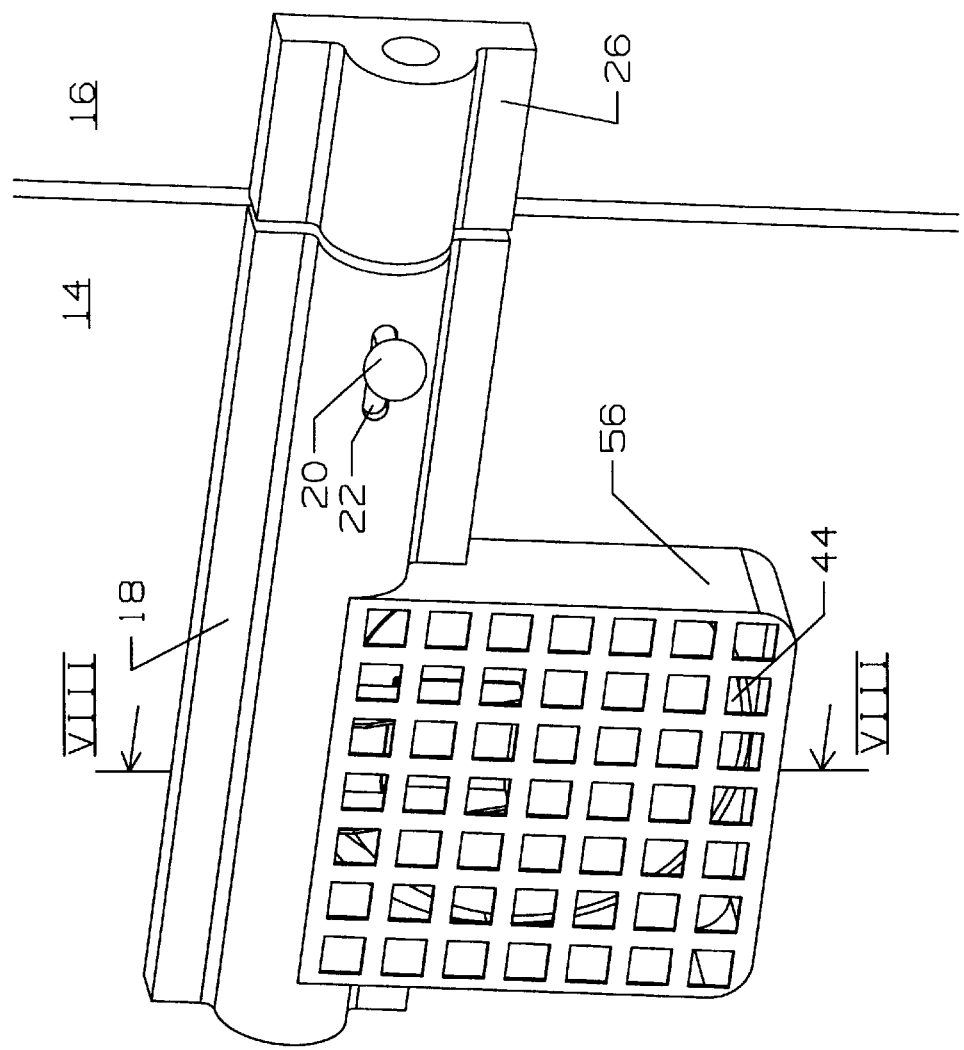
FIGS. 7 and 8 are simplified pictorial and sectional illustrations of a guard for guarding the door opener of FIG. 1, constructed and operative in accordance with a preferred embodiment of the present invention, FIG. 8 being taken along lines VIII—VIII in FIG. 7.
Figure 8:
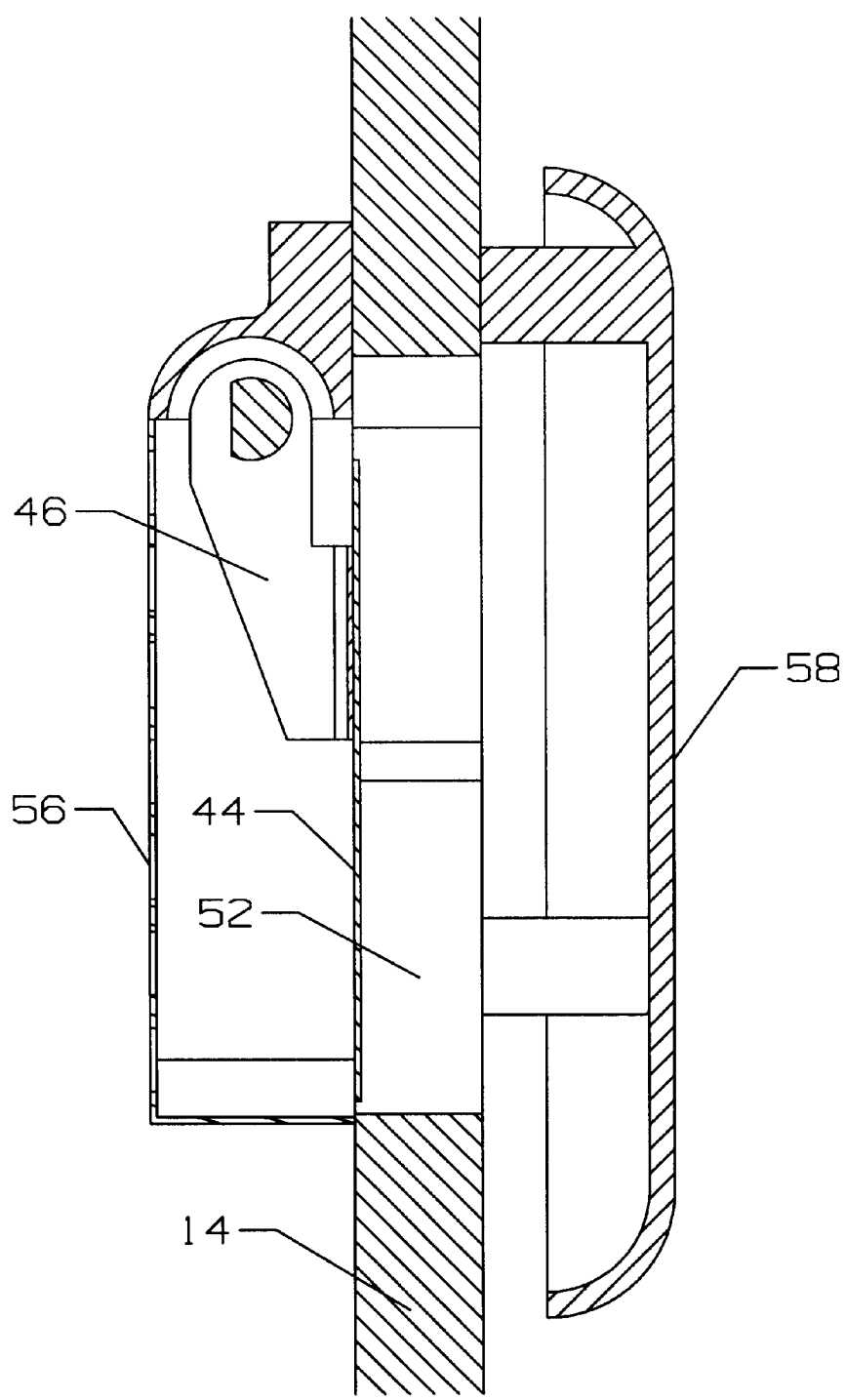
Figure 9:
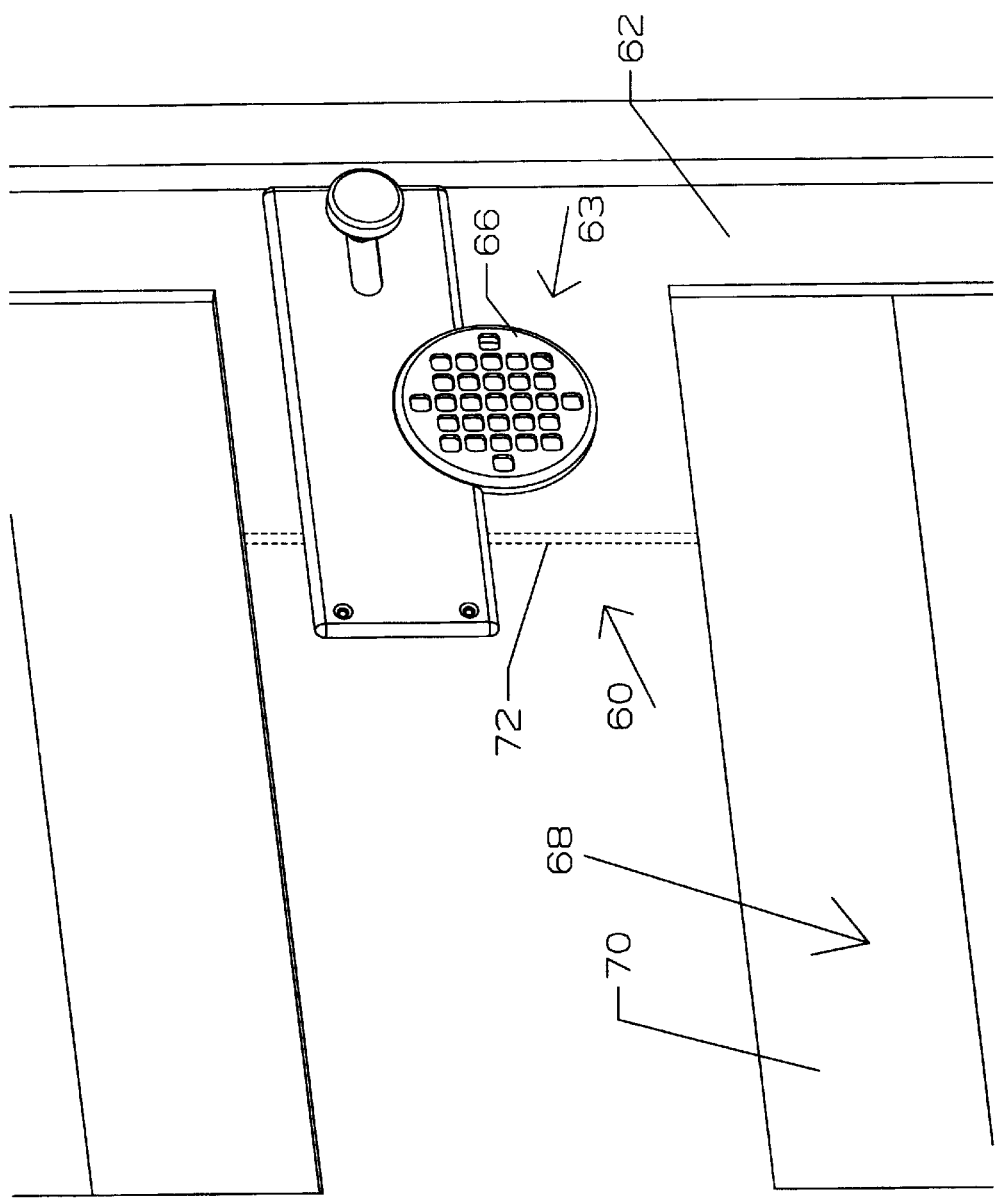
FIGS. 9–12 are simplified pictorial illustrations of access apparatus that opens a portion of a door, such as vanes or slats, in the presence of a sufficiently great pressure difference between opposite sides of the door (FIGS. 9 and 10 showing opposite sides of the door with the vanes closed and FIGS. 11 and 12 showing opposite sides of the door with the vanes open), constructed and operative in accordance with a preferred embodiment of the present invention.
Figure 10:
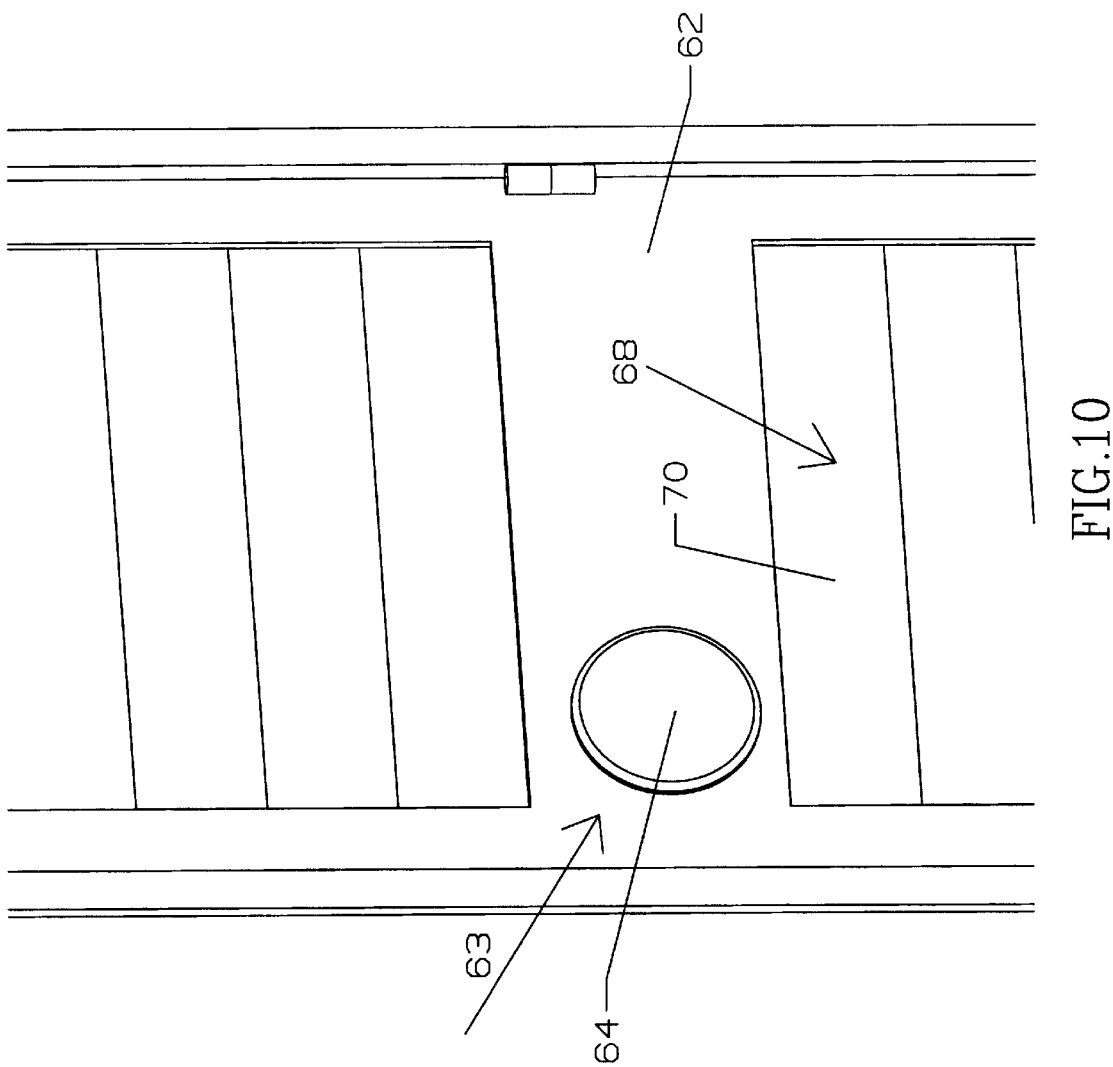

Reference is now made to FIGS. 7 and 8. The door opener may further comprise a guard 56 adapted to generally prevent access to flap 44. For example, on the inside of the door 14, guard 56 may comprise a grille with openings to allow the air pressure to move flap 44. On the outside of the door, as seen in FIG. 8, a robust guard 58 may be placed that prevents unauthorized personnel to push or otherwise move flap 44 and yet allows air pressure to move flap 44. It is noted that a reset mechanism (not shown) may be provided for resetting the door opener after the door opener has been used to open the door.

Reference is now made to FIGS. 9–12, which illustrate access apparatus 60, constructed and operative in accordance with a preferred embodiment of the present invention, which opens a portion of an access device 62, such as a door or window, in the presence of a sufficiently great pressure difference between opposite sides of the access device 62.

Figure 11:
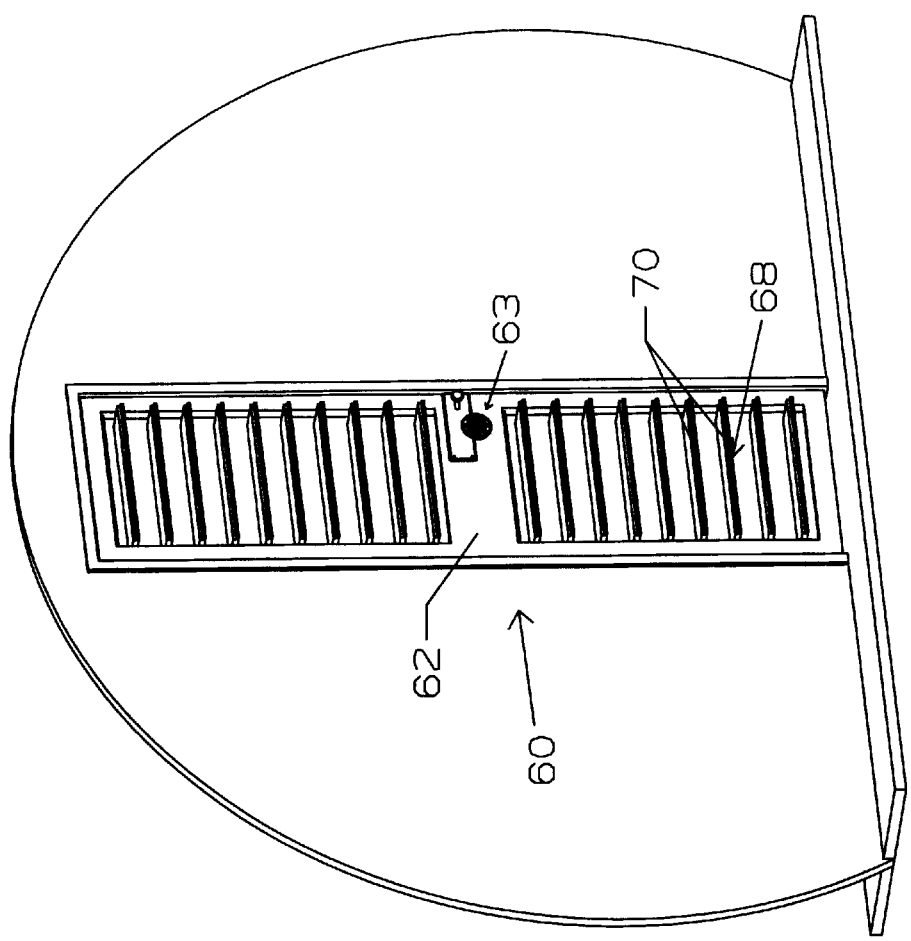
Figure 12:
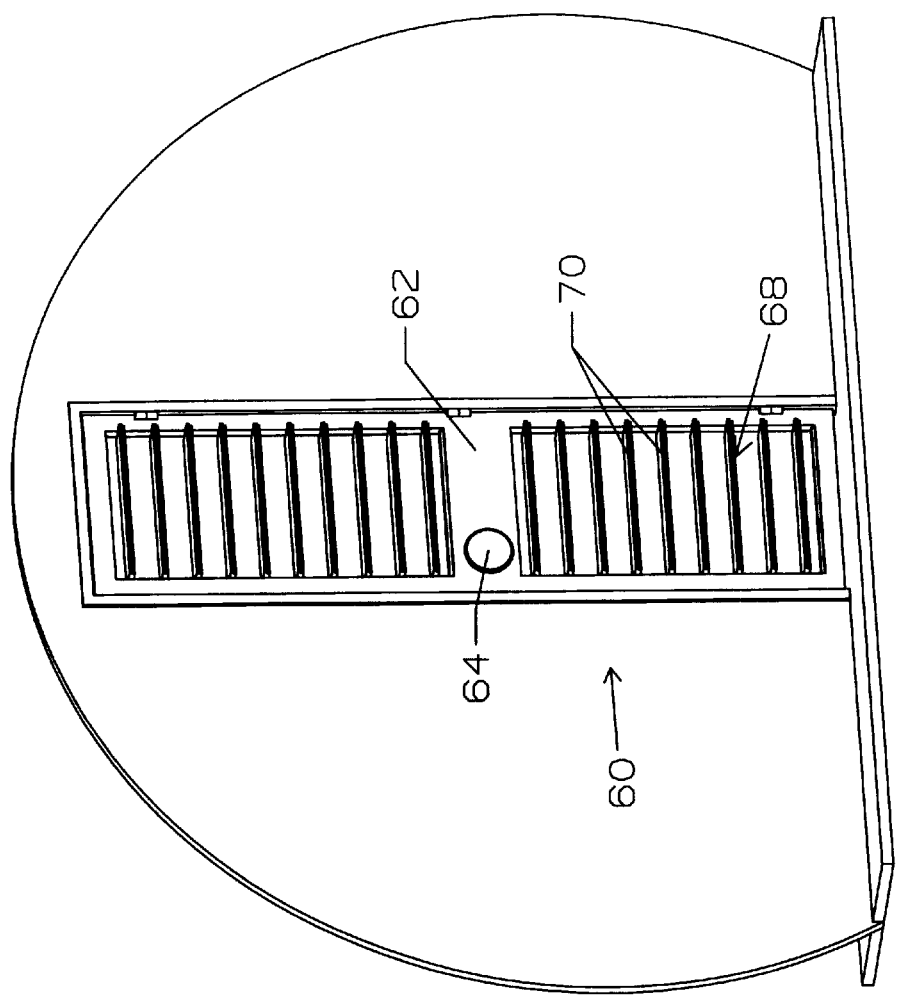

Access apparatus 60 may include a trigger device 63, which is actuable by a flap 64, and a guard 66, as similarly described hereinabove for bolt retractor apparatus (trigger device) 10, flap 44 and guard 58 in FIGS. 1–8. One or more openable elements 68 may be provided in access device 62, such as but not limited to, one or more vanes 70 pivotally mounted in access device 62. Vanes 70 may be arranged for opening vertically or horizontally or any other orientation. ("Vane" encompasses any kind of vane, slat, bar, shutter and the like, and the terms are used interchangeably.) When vanes 70 are in an open position, fluid (gas or liquid, such as but not limited to, air) may flow therethrough. The openable elements 68 may be actuated by trigger device 63 may any suitable linking apparatus 72. Accordingly, trigger device 63 may open openable elements 68 in the presence of a pressure difference of a predefined magnitude between opposite sides of access device 62, as seen in FIGS. 11 and 12 Alternatively or additionally, trigger device 63 may open the access device 62 itself in the presence of a pressure difference of a predefined magnitude between opposite sides of access device 62, as similarly described hereinabove for bolt retractor apparatus 10, which opens the door 14.

It will be appreciated by person skilled in the art that the present invention is not limited by what has been particularly shown and described herein above. Rather the scope of the present invention is defined only by the claims that follow:

What is claimed is:

1. Access apparatus comprising:
   a cockpit door comprising at least one vane arranged to move from a closed position to an open position, wherein in said open position said at least one vane is adapted to pass fluid therethrough; and
   opening apparatus coupled to said at Least one vane and adapted to move said at least one vane to said open position in a presence of a pressure difference of a predefined magnitude even if said cockpit door is locked.

2. Access apparatus according to claim 1, wherein said opening apparatus is adapted to move said at least one vane to said open position in a presence of a pressure difference of a predefined magnitude between opposite sides of said cockpit door.

3. Access apparatus according to claim 1, wherein said at least one vane is pivotally mounted with respect to said cockpit door.

4. Access apparatus according to claim 1, wherein said at least one vane is arranged to move vertically to said open position.

5. Access apparatus according to claim 1, wherein said at least one vane is arranged to move horizontally to said open position.

6. Access apparatus according to claim 1, wherein said opening apparatus comprises a trigger device adapted to urge said opening apparatus to said open position.

7. Access apparatus according to claim 6, wherein said trigger device comprises a flap arranged to move in the presence of said pressure difference, wherein a predefined movement of said flap actuates said trigger device.

8. Access apparatus according to claim 6, wherein said trigger device comprises a biasing device adapted to urge a bolt to a retracted position, and a retaining device comprising a first orientation wherein said retaining device is adapted to retain the bolt in a non-retracted position, and a second orientation wherein said retaining device is adapted to permit said biasing device to urge the bolt to the r acted position.

9. Access apparatus according to claim 8, further comprising a flap attached to a portion of said bolt, wherein movement of said flap causes rotation of said bolt about a longitudinal axis of said bolt so that said biasing device urges said retaining device into said second orientation.

10. Access apparatus according to claim 1, further comprising a guard adapted to generally prevent access to said opening apparatus.

11. Access apparatus according to claim 1, wherein said cockpit door comprises an anti-ballistic door.

* * * * *